(12) United States Patent
Holdsworth et al.

(10) Patent No.: US 8,694,952 B2
(45) Date of Patent: Apr. 8, 2014

(54) DESIGNING WIRING HARNESSES

(71) Applicant: Mentor Graphics Corporation, Wilsonville, OR (US)

(72) Inventors: Simon Edward Holdsworth, Tewkesbury (GB); Darin Merle Jackson, Durham, OR (US); Simon Norman Springall, Wilsonville, OR (US); Kevin Christopher Witten, Simi Valley, CA (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 13/770,995

(22) Filed: Feb. 19, 2013

(65) Prior Publication Data

US 2013/0226531 A1 Aug. 29, 2013

Related U.S. Application Data

(62) Division of application No. 12/964,655, filed on Dec. 9, 2010, now abandoned, which is a division of application No. 11/757,278, filed on Jun. 1, 2007, now abandoned.

(51) Int. Cl.
*G06F 17/50* (2006.01)
*G06F 15/04* (2006.01)

(52) U.S. Cl.
USPC .......................... 716/139; 716/126

(58) Field of Classification Search
USPC ................................. 716/126, 139
See application file for complete search history.

(56) References Cited

U.S. PATENT DOCUMENTS

| | | |
|---|---|---|
| 5,260,866 A | 11/1993 | Lisinski et al. |
| 5,551,028 A | 8/1996 | Voll et al. |
| 5,793,648 A | 8/1998 | Nagle et al. |
| 5,801,958 A | 9/1998 | Dangelo et al. |
| 6,110,213 A | 8/2000 | Vinciarelli et al. |
| 6,272,387 B1 | 8/2001 | Yoon |
| 6,457,165 B1 | 9/2002 | Ishikawa et al. |
| 6,606,731 B1 | 8/2003 | Baum et al. |
| 6,651,096 B1 | 11/2003 | Gai et al. |
| 6,708,313 B2 | 3/2004 | Pfeil et al. |
| 6,711,718 B2 | 3/2004 | Pfeil et al. |
| 6,886,057 B2 | 4/2005 | Brewer et al. |
| 7,003,360 B1 | 2/2006 | Dillon |

(Continued)

OTHER PUBLICATIONS

"Derived Option Expressions on Wiring (FEAT926)," believed to be available prior to the filing date, 6 pages.

(Continued)

*Primary Examiner* — Suresh Memula
(74) *Attorney, Agent, or Firm* — Klarquist Sparkman, LLP

(57) ABSTRACT

A method of designing a wiring harness using a wiring harness design tool can include allowing a first user to access and edit a first wiring harness design component in a wiring harness design workspace, allowing a second user to access and edit a second wiring harness design component in the wiring harness design workspace at least during a portion of the time that the first user is allowed to access and edit the first wiring harness design component, and displaying the first and second wiring harness design components to the first and second users during at least a portion of the time that access is allowed to the first and second users.

19 Claims, 12 Drawing Sheets

(56) References Cited

U.S. PATENT DOCUMENTS

| | | |
|---|---|---|
| 7,107,197 B1 | 9/2006 | Shropshire |
| 7,268,420 B2 | 9/2007 | Hirose |
| 7,378,733 B1 | 5/2008 | Hoang et al. |
| 7,464,348 B1 | 12/2008 | Lockman et al. |
| 7,558,705 B1 | 7/2009 | Hughes et al. |
| 2003/0079197 A1 | 4/2003 | Pannala et al. |
| 2003/0126576 A1 | 7/2003 | Graham et al. |
| 2004/0019399 A1 | 1/2004 | Kabasawa |
| 2004/0210854 A1 | 10/2004 | Pfeil et al. |
| 2004/0225988 A1 | 11/2004 | Petunin et al. |
| 2005/0044518 A1 | 2/2005 | Petunin et al. |
| 2005/0114821 A1 | 5/2005 | Petunin et al. |
| 2005/0114865 A1 | 5/2005 | Petunin |
| 2005/0240383 A1 | 10/2005 | Hashima et al. |
| 2006/0095882 A1 | 5/2006 | Mankin et al. |
| 2006/0101368 A1 | 5/2006 | Kesarwani et al. |
| 2007/0073809 A1 | 3/2007 | Sangem et al. |
| 2008/0082948 A1 | 4/2008 | Boose |
| 2008/0301613 A1 | 12/2008 | Holdsworth et al. |
| 2008/0307382 A1 | 12/2008 | Holdsworth et al. |
| 2009/0157209 A1 | 6/2009 | Holdsworth |

OTHER PUBLICATIONS

Holdsworth, "Wire Option Tags Study," Mentor Graphics, Oct. 2002, 7 pages.

Park et al., "An Agent-Based Approach to Concurrent Cable Harness Design," AIEDAM, vol. 8, No. 1, 1994, 33 pages.

Sinz et al., "Formal Methods for the Validation of Automotive Product Configuration Data," Artificial Intelligence for Engineering and Design, vol. 17, pp. 75-97 (Jan. 2003).

"Capital Harness Systems—OEM Modules", Mentor Graphics Corporation, 2002, 2 pages.

The Free Dictionary, "Bypass", citing Collins Discovery Encyclopedia, $1^{st}$ edition, HarperCollins Publishers, 2005, retrieved from htttp://encyclopedia2.thefreedictionary.com on May 19, 2011.

Mano, "Digital Design," $3^{rd}$ Edition, Prentice-Hall, 2002, pp. 36-82.

"Multisim User Guide," National Instruments, Jan. 2007, 425 pages.

Sinz et al. "Comparing Different Logic-Based Representations of Automotive Parts Lists," *ECAI 2006 Workshop on Configuration*, Aug. 2006, 62 pages.

"TransOVM," Mentor Graphics Corporation, 2002, 2 pages.

"TransLayout," Mentor Graphics Corporation, 2002, 2 pages.

Weisstein, "Disjunctive Normal Form," retrieved from http://mathworld.wolfram.com on May 19, 2011.

DESIGNING WIRING HARNESSES

CROSS REFERENCE TO RELATED APPLICATIONS

This is a divisional of U.S. patent application Ser. No. 12/964,655, filed Dec. 9, 2010, which is a divisional of U.S. patent application Ser. No. 11/757,278, filed on Jun. 1, 2007, both of which are hereby incorporated by reference.

FIELD

The disclosed technology relates to designing wiring harnesses including, but not limited to, electronic wiring harness design tools and methods of designing wiring harnesses.

BACKGROUND

Connectivity between electrical and electromechanical components (e.g., circuit packages, fuse panels, and circuit boards) can be accomplished by way of a wiring harness. A wiring harness generally refers to a collection (e.g., bundle) of one or more wires coupled together. One example of a wiring harness is a bundle of separately insulated wires that couple an automobile dashboard with the control electronics for the automobile's engine. Another example is a bundle of wires that couple an airplane cockpit to the wing assembly, engines, tail assembly, and landing gear.

Wiring harness diagrams can reduce a potentially complicated collection of wires to a readable map of components and connections. Wiring harnesses can be represented using wiring harness diagrams, which can include many physical details of the wires, couplings, and components of a particular wiring harness. Software tools, such as the Capital® Harness Systems™ (CHS) product suite by Mentor Graphics Corporation, allow a user to design, analyze, engineer, and produce wiring harnesses for various types of electrical interconnect systems.

Previous wiring harness design tools known to the inventors, however, have been limited in various aspects. For example, a user login would only allow one designer at a time to work on (e.g., edit) his or her wiring harness design(s), effectively locking out other users from working on their own wiring harness designs. If another designer wanted to edit his or her wiring harness design(s), he or she would need to wait until the first user logged out and then login separately in a different session.

Also, previous systems provided access to a designer on a workspace basis, as opposed to a wiring harness design basis. Since a workspace often has multiple harness designs each assigned to different users, this arrangement meant that users may have had access to one or more wiring harness designs that were not meant to be made available to them for editing.

Thus, there exists a need for improved electronic wiring harness design tools and methods.

SUMMARY

A wiring harness can be designed using a wiring harness design tool. In accordance with one aspect, the wiring harness design tool can allow a first user to access and edit a first wiring harness design component in a wiring harness design workspace, allow a second user to access and edit a second wiring harness design component in the wiring harness design workspace at least during a portion of the time that the first user is allowed to access and edit the first wiring harness design component, and display the first and second wiring harness design components to the first and second users during at least a portion of the time that access is allowed to the first and second users.

In some embodiments, a first wiring harness design component can be locked against editing by a second user when a first user has access to the first wiring harness design component for editing by the first user, and a second wiring harness design component can be locked against editing by the first user when the second user has access to the second wiring harness design component for editing by the second user.

In some embodiments, a wiring harness design tool can display wiring harness design components in a wiring harness design workspace and visually indicate and differentiate wiring harness design components that are locked by a first user, that are locked by a second user, and that are unlocked.

In some embodiments, a computer implemented display can display a wiring harness design workspace, a first visual indicator corresponding to a first wiring harness design component in the wiring harness design workspace, wherein the first wiring harness design component is editable by a first user but locked against editing to a second user, and a second visual indicator corresponding to a second wiring harness design component in the wiring harness design workspace, wherein the second wiring harness design component is editable by the second user but locked against editing to the first user.

In some embodiments, a wiring harness design tool can also track information regarding changes made within a wiring harness design workspace (e.g., placement and/or removal of locks and creation, modification, and/or deletion of wiring harness design components). This information can be stored in a log, for example.

The foregoing and other features and aspects of the disclosed technology will become more apparent from the following detailed description, which proceeds with reference to the accompanying figures.

BRIEF DESCRIPTION OF THE DRAWINGS

FIG. 11 does not show the slot or wire added by the third user.

DETAILED DESCRIPTION

Figure 1:
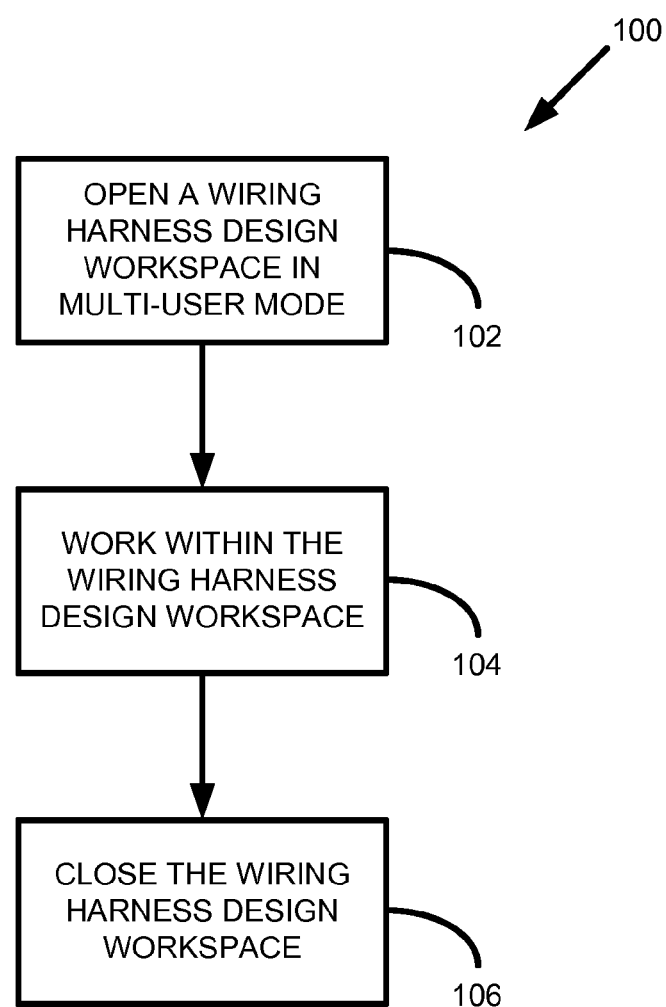
FIG. 1 shows a general method of designing wiring harnesses using an electronic wiring harness design tool in multi-user mode.

Disclosed below are representative embodiments of methods, apparatus, and systems for designing wiring harnesses that should not be construed as limiting in any way. Instead, the present disclosure is directed toward all novel and non-obvious features and aspects of the various disclosed methods and systems, alone and in combination with one another. The disclosed technology is not limited to any specific aspect or feature, or combination thereof, nor do the disclosed methods and systems require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially can be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine," "analyze" and "identify" to describe the disclosed technology. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an" and "the" include the plural forms unless the context clearly dictates otherwise. Additionally, the term "includes" means "comprises." Further, the term "coupled" means electrically connected or linked and does not exclude the presence of intermediate elements between the coupled items. The phrase "and/or" can mean "and," "or," or "both."

Exemplary Definitions

For purposes of this specification, a wiring harness refers to a bundle of wires that may include other components (e.g., connectors, splices, and multicores), wherein at least some of the wires terminate in at least one component such as a connector. A wire can be a standard conductor (e.g., copper) or any other type of applicable conductor (e.g., optical).

For purposes of this specification, an electronic wiring harness design tool refers to a software tool or suite that provides a user with the ability to create, modify, and/or save at least one wiring harness design. As described elsewhere within this specification, the software tool or suite can be implemented in one or more tangible computer readable media and/or as a computer program product.

For purposes of this specification, a wiring harness design workspace refers to a partial or complete view (e.g., a topology) of the wiring harness makeup of an entity (e.g., a vehicle). One or more topologies can be implemented within a single wiring harness design workspace.

For purposes of this specification, a slot refers to a representation of a physical space or component intended to receive at least one electrical component (e.g., an electrical device or a wire). For example, a slot in an automobile wiring harness design workspace can refer to a battery intended to receive certain power-related wires (e.g., by way of a connector). A single-harness slot refers to a slot intended to attach to a single harness using one or more connectors, for example. A multi-harness slot refers to a slot that can attach to more than one harness.

For purposes of this specification, a wiring harness design component refers to an editable component within a wiring harness design, such as a wiring harness or a slot.

Placing a lock on an item refers to an action carried out with respect to a wiring harness diagram workspace or one or more wiring harness design components within the wiring harness design workspace (e.g., a wiring harness) such that the lock prevents certain users from performing certain actions (e.g., viewing or editing) with respect to the item or items being locked.

A plane lock refers to a lock on a complete plane (e.g., a wiring harness design workspace or one or more topologies) such that certain users are prevented from editing any part of the plane while the lock is in effect. In some embodiments, a plane lock can also prevent the locked-out users from even viewing at least or portion or all of the wiring harness design workspace.

A harness lock refers to a lock on a wiring harness. For example, when a user is working on (e.g., viewing, analyzing, or editing) a particular wiring harness, he or she can implement a harness lock to prevent other users from modifying the wiring harness while he or she is working on it.

A slot lock refers to a lock on a particular slot. For example, when a user is working on (e.g., viewing, analyzing, or editing) a particular slot, he or she can implement a slot lock to prevent other users from modifying the slot while he or she is working on it. For example, a user may want to preclude other users from modifying a particular slot while the user is working on a wiring harness design that connects to the particular slot.

Exemplary Systems and Methods for Designing Wiring Harnesses

FIG. 1 shows a general method 100 of designing wiring harnesses using an electronic wiring harness design tool. The wiring harness tool has two or more modes of operation. For example, the tool has a single-user mode, in which only one user can work within a certain wiring harness design workspace at a time, and it also has a multi-user (e.g., concurrent) mode, in which more than one user can work within the same wiring harness design workspace. Two or more users can each edit one or more wiring harness designs within the same wiring harness design workspace at least partially simultaneously and also lock a wiring harness design against editing by the other user.

In some embodiments, user access rights (e.g., privileges) that determine which users can access which wiring harness design components within the wiring harness design workspace can be set (e.g., by an administrator). These rights can be used to preclude certain users from being able to access (e.g., edit) certain wiring harness design components.

At 102, a user (e.g., a wiring harness designer) opens a wiring harness design workspace in multi-user mode. The user can create a new wiring harness design workspace or open a previously-created wiring harness design workspace. In some embodiments, the user can open multiple wiring harness design workspaces within the same session.

At 104, the user works on one or more wiring harness designs within the wiring harness design workspace. This can include creating new wiring harness designs and/or viewing, analyzing, editing, and/or saving previously-created wiring harness designs.

At 106, the user closes the wiring harness design workspace. For example, the user can save his or her work and then close the application or merely log off so that another user can login at that terminal.

Figure 2:
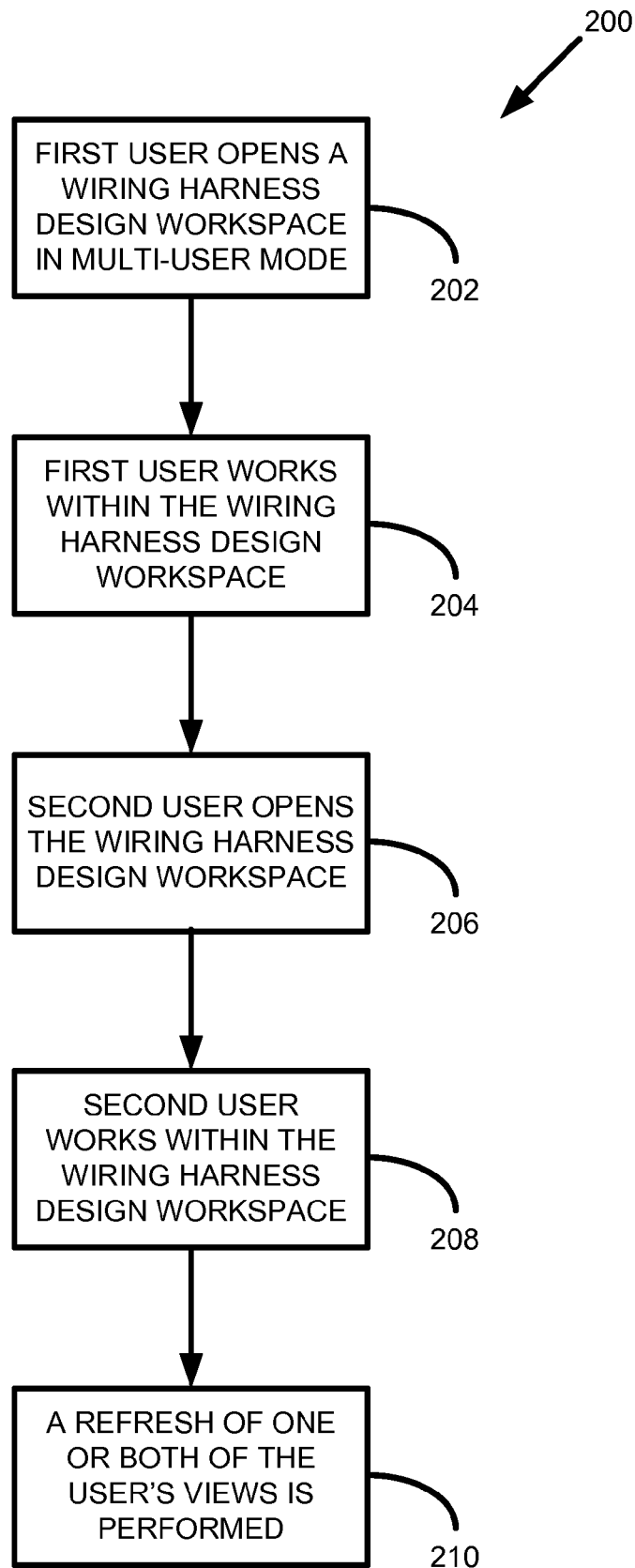
FIG. 2 shows another general method of designing wiring harnesses using an electronic wiring harness design tool in multi-user mode.

FIG. 2 shows another general method 200 of designing wiring harnesses using an electronic wiring harness design tool.

At 202, a first user (e.g., a wiring harness designer) opens a wiring harness design workspace in multi-user mode, which step can include the first user creating a new wiring harness design workspace or opening a previously-created wiring harness design workspace.

At 204, the first user works on one or more wiring harness designs within the wiring harness design workspace, which step can include the first user creating new wiring harness designs and/or viewing, analyzing, editing, and/or saving previously-created wiring harness designs.

At 206, a second user (e.g., another wiring harness designer) logs in to the same wiring harness design workspace opened by the first user. While working in multi-user (e.g., concurrent) mode, each user generally has the same view of the logical design data at least until changes are made by one or more users.

The first user can lock a first wiring harness design component against editing by the second user when the first user has access to the first wiring harness design component for editing by the first user. Also, the second user can lock a second wiring harness design component against editing by the first user when the second user has access to the second wiring harness design component for editing by the second user.

Locks can be placed on wiring harness design components manually and/or automatically in various embodiments. For example, a lock can be automatically placed on one or more wiring harness design components when a user switches to a certain mode (e.g., edit mode). A lock can also, for example, be automatically placed on one or more wiring harness design components when a second user logs into a wiring harness design workspace being edited by a first user. In some embodiments, a user can define rules used in determining whether a lock is to be placed on a wiring harness design component.

The wiring harness design components in the wiring harness design workspace can be displayed, and wiring harness design components that are locked by the first user, that are locked by the second user, and that are unlocked can be visually indicated and differentiated by, for example, using a different color for at least one of the wiring harness design components or using a first level of contrast for first wiring harness design components in the wiring harness design workspace and using a second level of contrast different from (e.g., dimmer than) the first level of contrast for second wiring harness design components in the wiring harness design workspace.

In some embodiments, wiring harness design components in the wiring harness design workspace that are locked by the first user, by another user, and/or unlocked wiring harness design components can be visually distinguished in a display. For example, such locked wiring harness design components can be indicated in a first color, the brightness of wiring harness design components in the wiring harness design workspace locked against editing by a user other than the first user can be reduced, and wiring harness design components in the wiring harness design workspace that have not been locked against editing can be indicated by a second color that is different from the first color.

At 208, the second user works on one or more wiring harness designs within the wiring harness design workspace, which step can include the second user creating new wiring harness designs and/or editing previously-created wiring harness designs. This step can occur at least partially simultaneously with step 204.

At 210, one or both of the two users can refresh their view of the wiring harness design workspace, which step can include revealing to the refreshing user(s) what if any changes the other user(s) made to any wiring harness designs. For example, when another user creates a new wiring harness design, the wiring harness design tool can be configured such that the new wiring harness design are not to be displayed to the user until a refresh occurs. In some embodiments, this refreshing step is performed automatically by the wiring harness design tool.

The wiring harness design tool can also perform a refresh operation in response to a user making a particular change within the wiring harness design workspace. The change may or may not impact the other user work sessions. For example, the tool can perform a refresh operation for the first user if the second user makes a change to a wiring harness, slot, and/or connector that may impact one or more wiring harness designs being worked on by the first user. This is advantageous because it provides a user with the ability to adapt his or her wiring harness design(s) in response to a change elsewhere in the wiring harness design workspace by another user.

The refreshing step 210 can also be performed in response to a user initiated request. For example, a user can perform a refresh request (e.g., click on a refresh button) to see if there are any changes within the wiring harness design workspace that my impact the work he or she is presently doing. This is advantageous because it provides a user with the ability to confirm that his or her wiring harness design(s) will comport with at least the rest of the wiring harness design workspace that couples with his or her design(s).

FIGS. 3 through 11 show an exemplary multi-user case scenario in which three users (e.g., wiring harness designers) each login to the same wiring harness design workspace 300. Each user session may or may not overlap in time with one or more of the other user sessions.

Figure 3:
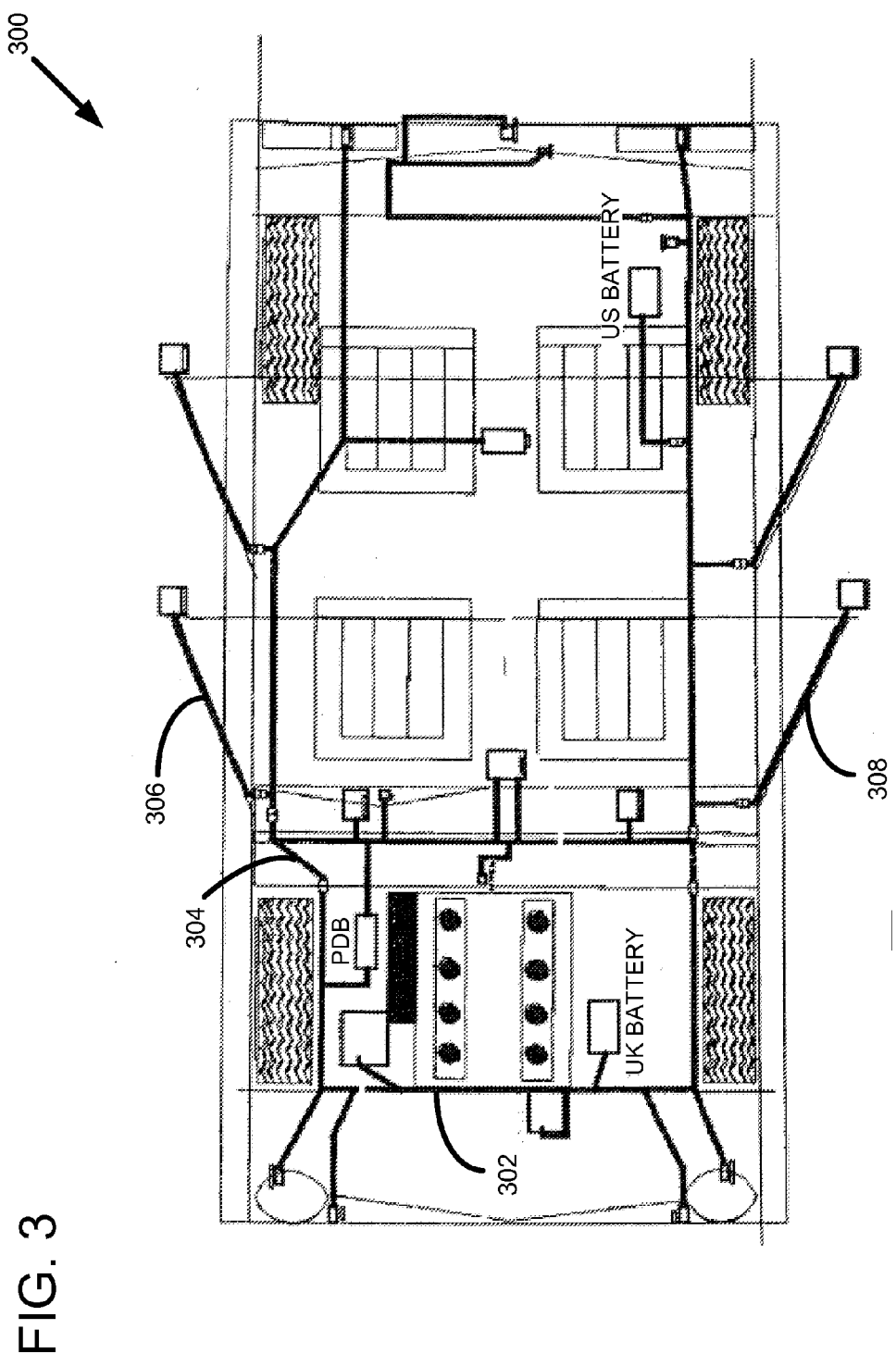
FIG. 3 shows an exemplary wiring harness design workspace as viewed by a first user, in which all of the wiring harness designs are fully accessible (e.g., visible and modifiable or editable) to the first user.

FIG. 3 shows an exemplary wiring harness design workspace 300 as viewed by a first user. In the example, the wiring harness design workspace (e.g., vehicle topology) is an automobile topology having multiple wiring harness designs 302-308. All of the wiring harness designs 302-308 in FIG. 3 are fully accessible (e.g., modifiable) to the first user.

Figure 4:
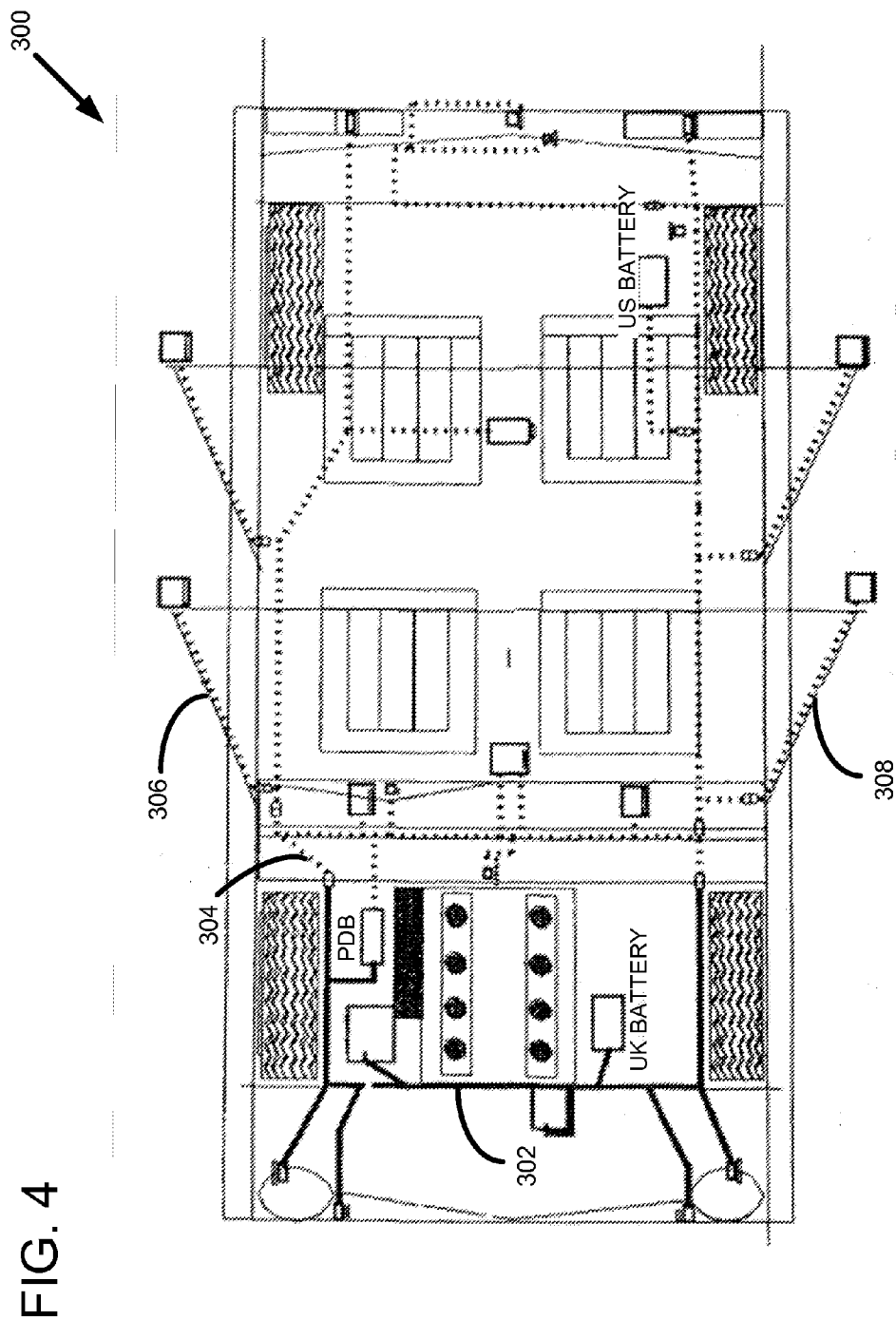
FIG. 4 shows the wiring harness design workspace of FIG. 3 as viewed by the first user, in which the first user can now see exemplary harness locks that have been implemented by another user or users on some of the wiring harness designs in the wiring harness design workspace.

FIG. 4 shows the wiring harness design workspace 300 as viewed by the first user. In FIG. 4, the first user can see exemplary harness locks that have been implemented by another user or users on some of the wiring harness designs 304-308 in the wiring harness design workspace 300, as represented by the dashed lines.

For purposes of clarity and simplicity, the harness locks in the example are represented by dashed lines but can be represented in various other ways. For example, harness locks can be represented by the displayed wiring harness designs having a different dimness (e.g., grayscale), color, and or line style than the non-locked wiring harness designs.

Additionally, a user can be provided with the ability to change the representation of a lock such as a harness lock. For example, a user can be provided a user interface tool (e.g., a sliding scale) corresponding to a harness lock such that the user can adjust the dimness of the displayed harness having the lock. The dimness range can include a total dimness level such that the locked harness is not visible at all to the user.

The use of locks can provide a user with a variety of certain advantageous actions that can now be performed within a wiring harness design workspace. For example, merge harness functionality generally requires that all harness to be merged together are locked by the user seeking to perform the merge. When a first wiring harness design component (e.g., a wiring harness) is merged into a second wiring harness design component, the first wiring harness design component can be deleted (e.g., automatically in response to a user saving changes in the wiring harness design workspace). In general, deletion of wiring harness designs can require that they be locked prior to deletion to ensure that such deletion will not impact any other users working within the wiring harness design workspace at the same time.

In FIG. 4, the locked wiring harness designs 304-308 can each be viewed by the first user but not modified. The non-locked wiring harness design 302, however, can be edited by the first user. For example, the first user can change the layout, wires, signals, signal routes, and/or connections with respect to the non-locked wiring harness design 302.

Figure 5:
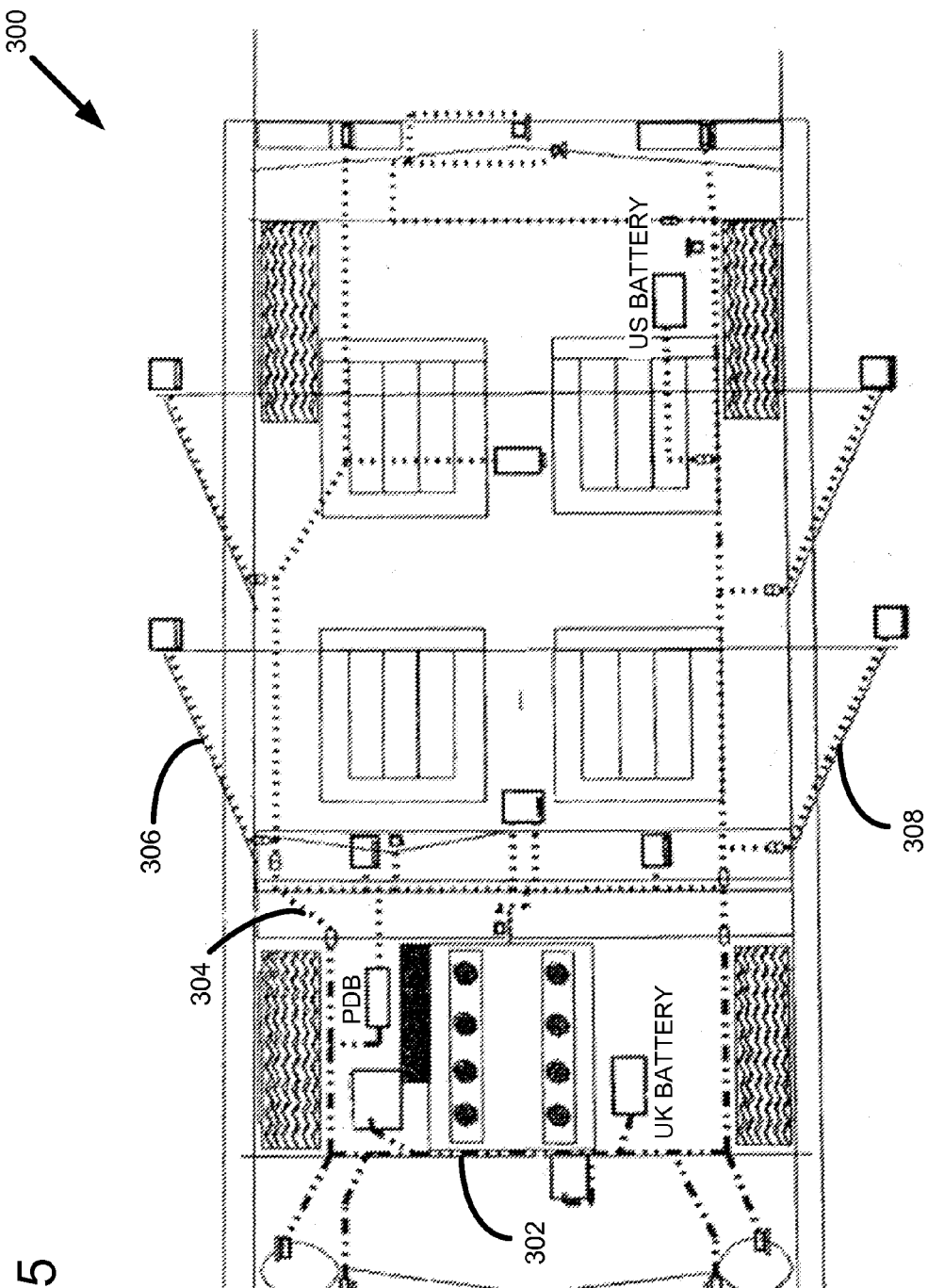
FIG. 5 shows the wiring harness design workspace of FIG. 3 as viewed by a second user who is locked out of all of the wiring harness designs.

FIG. 5 shows the wiring harness design workspace 300 as viewed by a second user who is locked out of all of the wiring harness designs 302-308. In this example, the second user can view all of the wiring harness designs 302-308 but he or she is prevented from modifying or editing any of the wiring harness designs 302-308. Unless a plane lock has been implemented, however, the second user can be allowed to create new wiring harness designs within the wiring harness design workspace 300.

Figure 6:
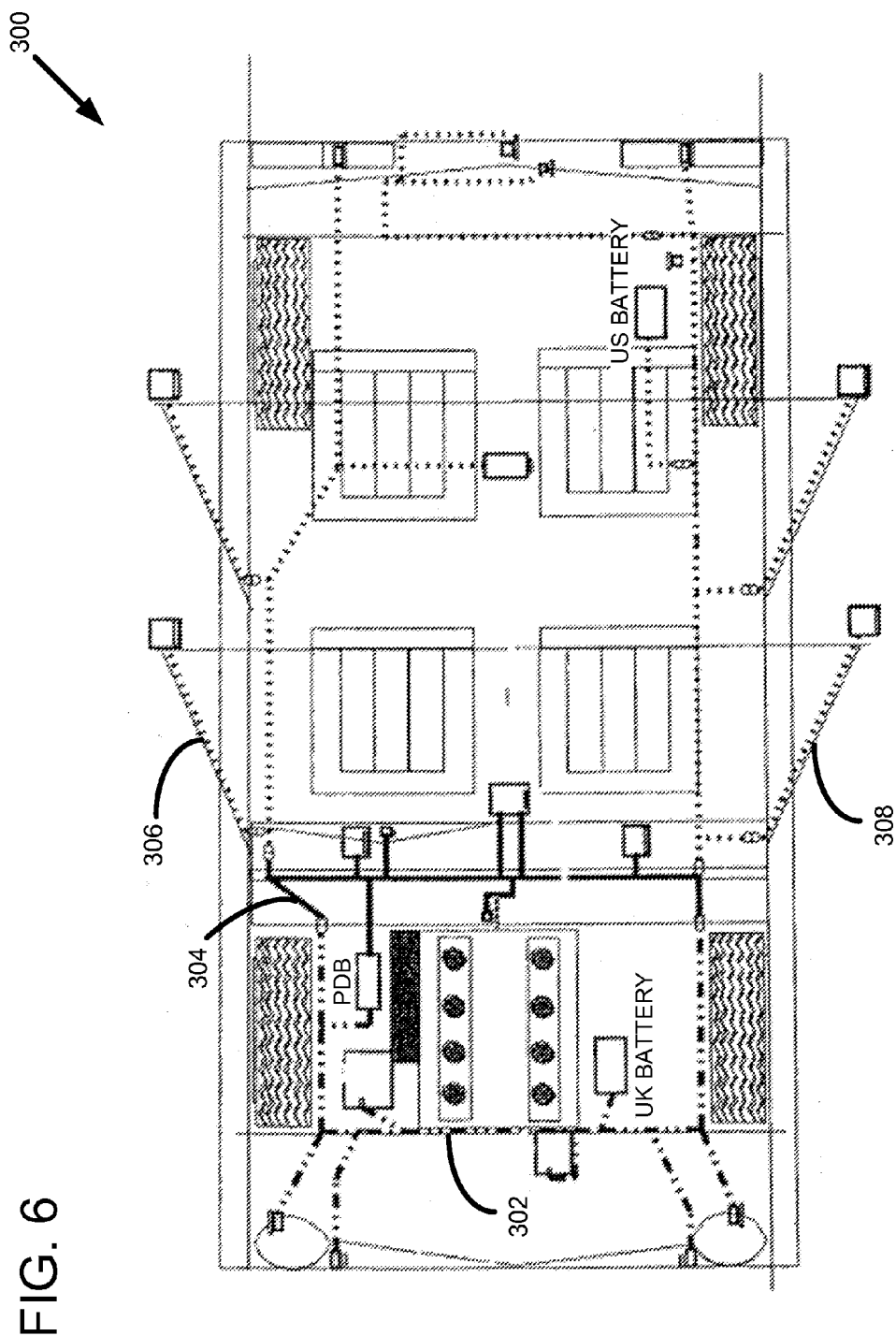
FIG. 6 shows the wiring harness design workspace of FIG. 3 as viewed by a third user who is locked out of some of the wiring harness designs but has access to one of the wiring harness designs.

FIG. 6 shows the wiring harness design workspace 300 as viewed by a third user who is locked out of some of the wiring harness designs 302, 306, and 308, but has access to one of the wiring harness designs 304. In this example, the third user can view all of the locked wiring harness designs 302, 306, and 308 but he or she is prevented from modifying or editing any of the wiring harness designs 302, 306, and 308. The third user is allowed, however, to modify the non-locked wiring harness design 304. The third user can also be allowed to create new wiring harness designs within the wiring harness design workspace 300.

In FIG. 6, the harness lock on one wiring harness design 302 is represented by a dashed pattern that is different than that used to represent the harness locks on the other wiring harness designs 306 and 308. In the example, this is done by the tool to illustrate that the harness lock on wiring harness design 302 was implemented by the first user and that the harness locks on the wiring harness designs 306 and 308 were implemented by the second user.

Locks (e.g., harness locks and plane locks) can be indicated to a user by a user interface. For example, the wiring harness design tool can have a user interface that displays one or more fields with information regarding the locks. In some embodiments, a table is displayed showing which wiring harness designs are locked and by which user. The user(s) implementing a harness lock can indicate what, if any, information pertaining to the lock is to be presented to other users.

Figure 7:
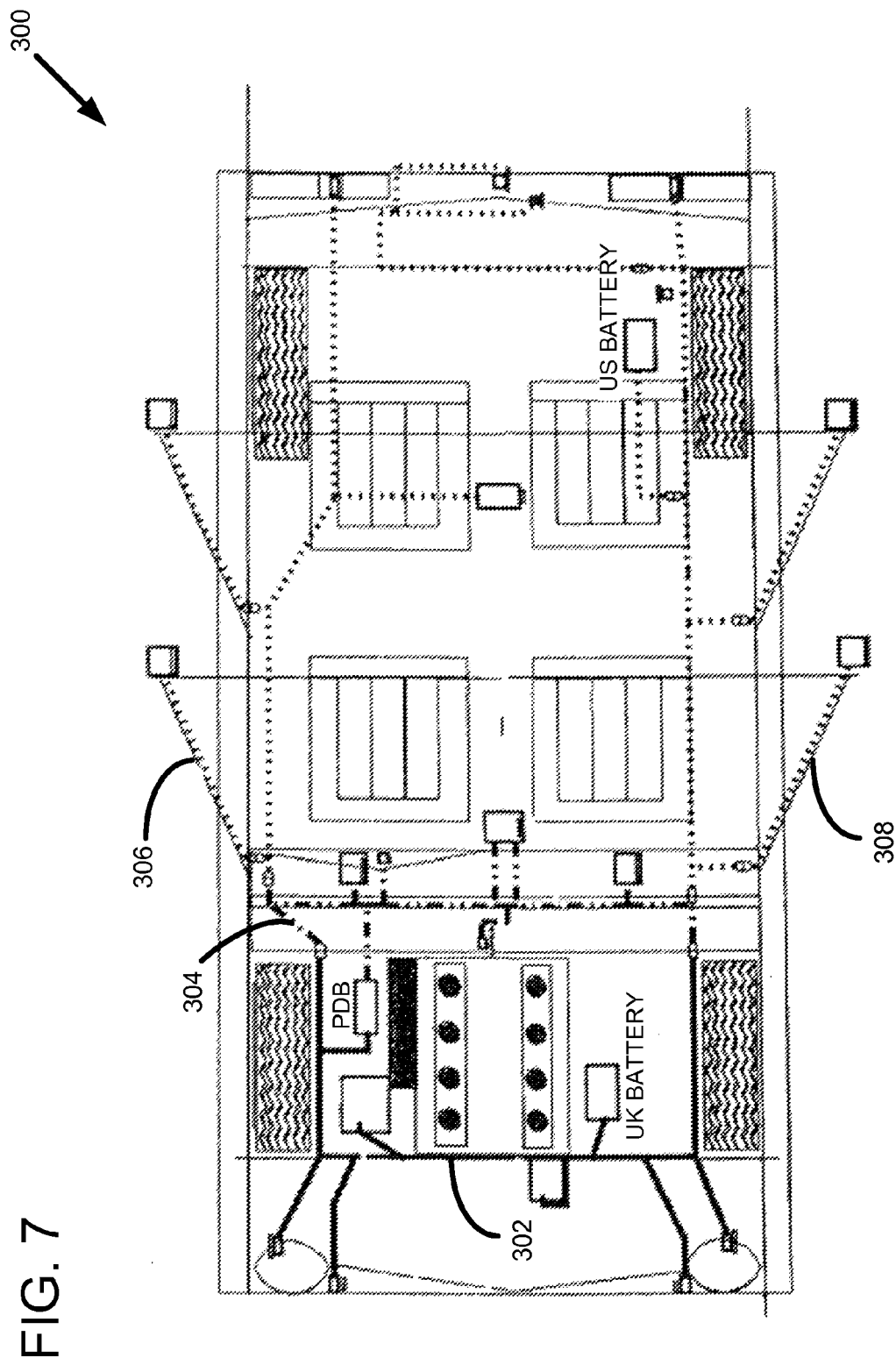
FIG. 7 shows the wiring harness design workspace of FIG. 3 as viewed by the first user again, but now the first user can tell that a harness lock on one wiring harness design was implemented by one user and that the harness locks on the other wiring harness designs were implemented by another user.

FIG. 7 shows the wiring harness design workspace 300 as viewed by the first user again, but now the first user can tell that a harness lock on one wiring harness design 304 was implemented by one user and that the harness locks on the wiring harness designs 306 and 308 were implemented by another user because the harness lock on wiring harness design 304 is represented by a dashed pattern that is different than that used to represent the harness locks on the other wiring harness designs 306 and 308.

Figure 8:
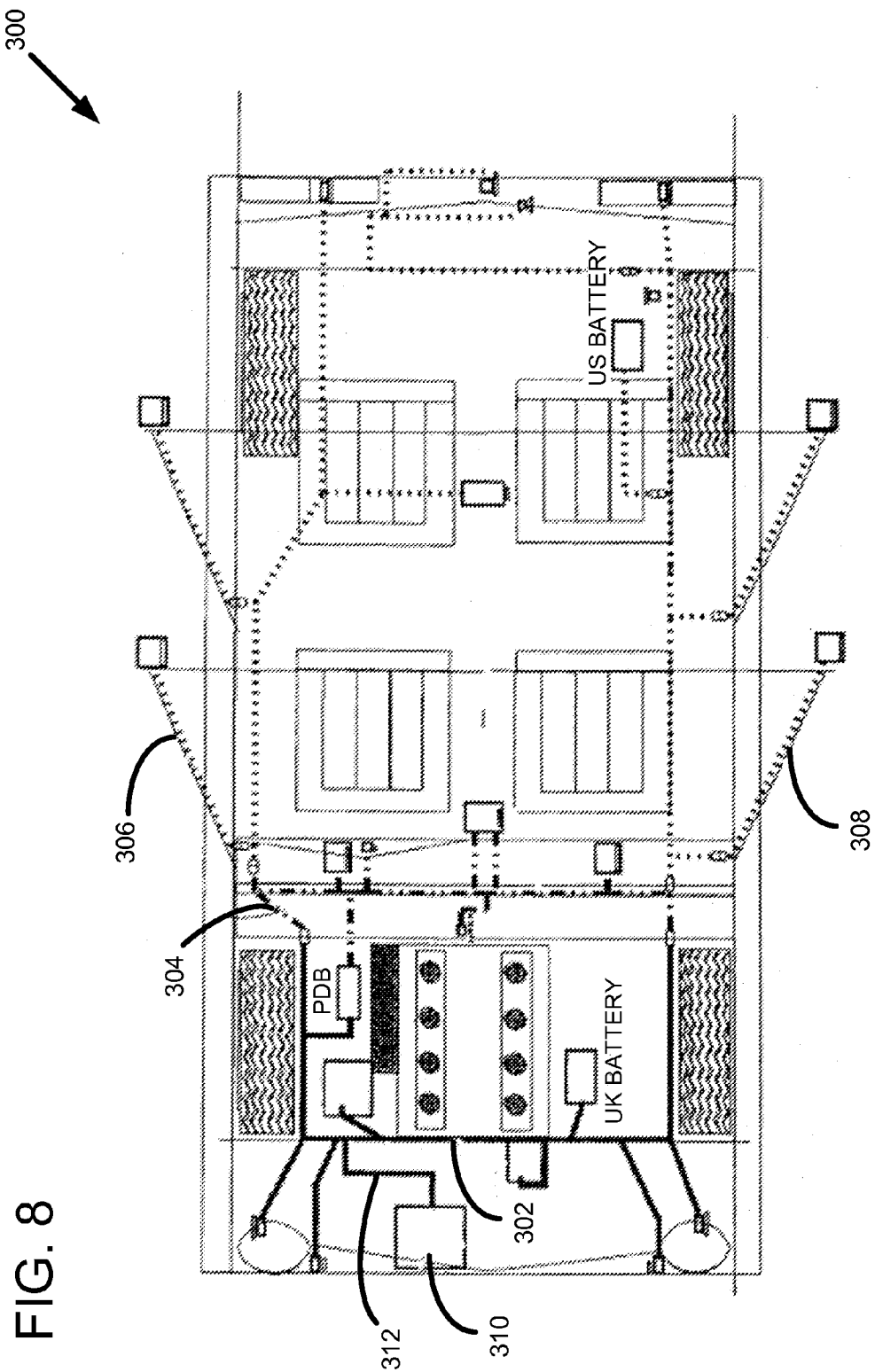
FIG. 8 shows the wiring harness design workspace of FIG. 3 as viewed by the first user, who has now added a slot to the wiring harness design workspace as well as a wire connecting to the slot to a wiring harness design within the wiring harness design workspace.

FIG. 8 shows the wiring harness design workspace 300 as viewed by the first user, who has now added a slot 310 (e.g., a winch slot) to the wiring harness design workspace 300. The user has also added a wire bundle 312 to the wiring harness design 302 that can connect to the new slot 310.

Figure 9:
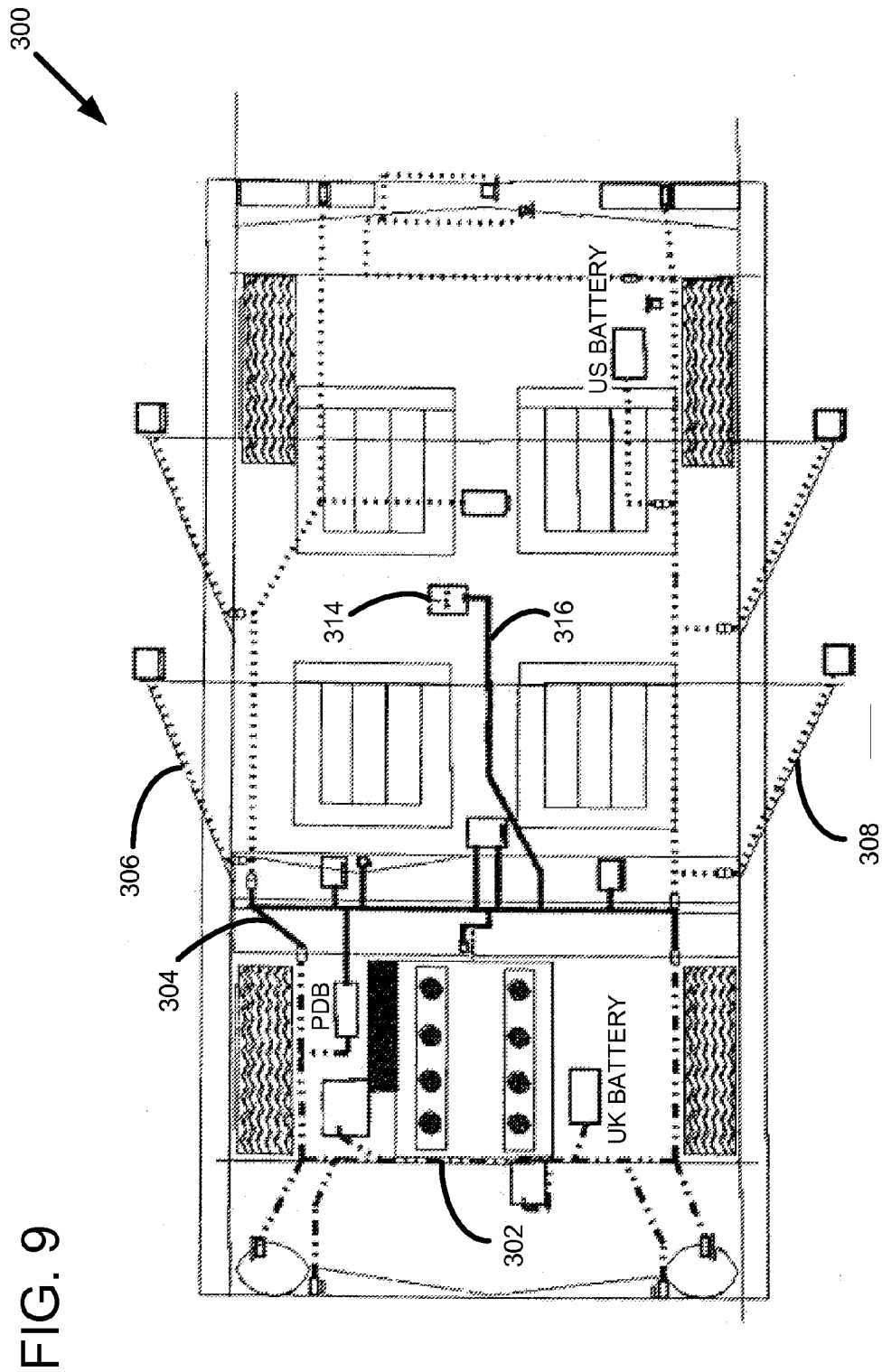
FIG. 9 shows the wiring harness design workspace of FIG. 3 as viewed by the third user, who has now added a slot to the wiring harness design workspace as well as a wire connecting to the slot to a wiring harness design within the wiring harness design workspace.
Figure 10:
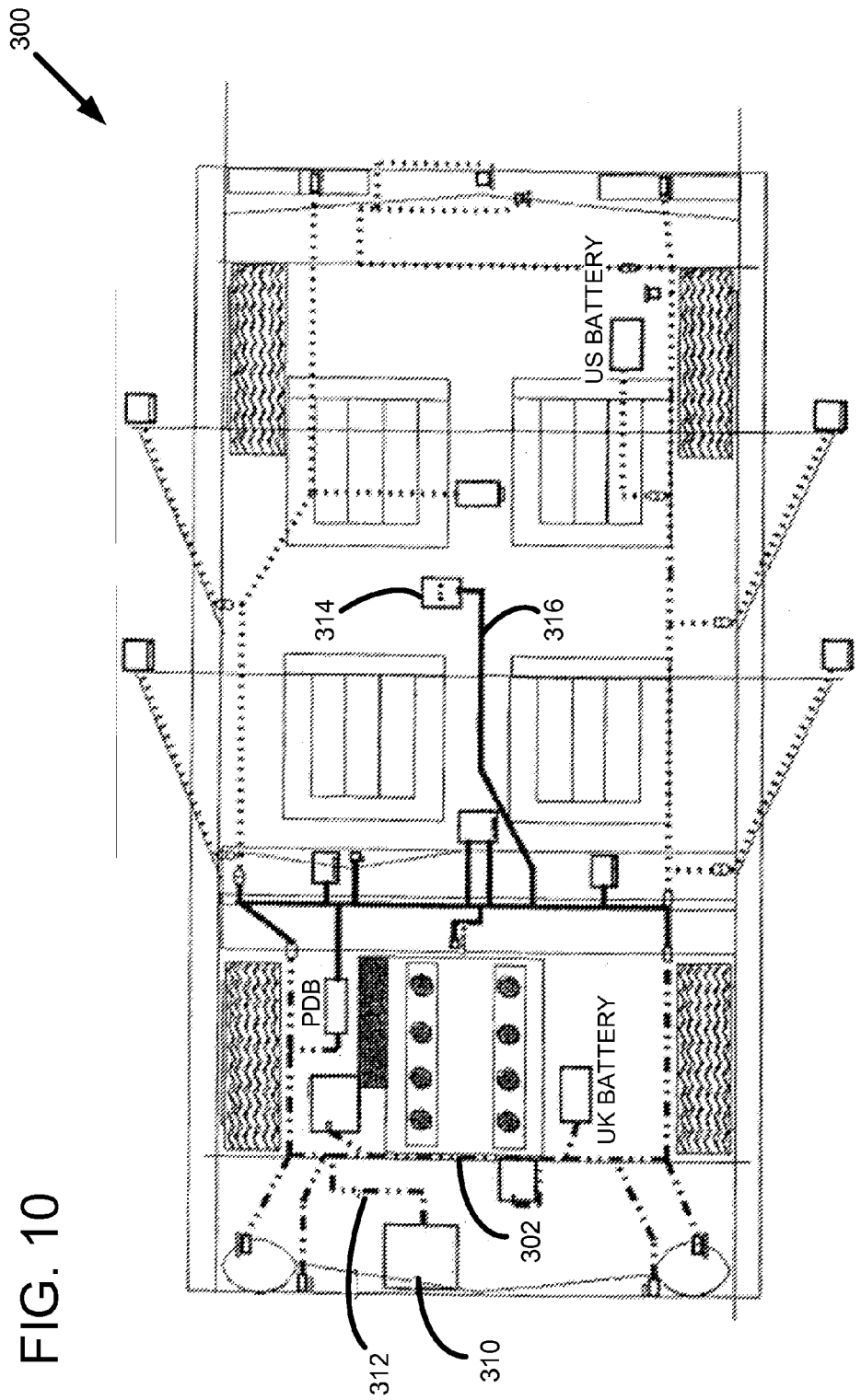
FIG. 10 again shows the wiring harness design workspace of FIG. 3 as viewed by the third user, but now the view has been refreshed such that the third user is able to view the slot and wire added by the first user.

FIG. 9 shows the wiring harness design workspace 300 as viewed by the third user, who has now added a slot 314 (e.g., a DVD player slot) to the wiring harness design workspace 300. The user has also added a wire bundle 316 to the wiring harness design 304 that can connect to the new slot 314. FIG. 9 does not show the slot 310 or wire bundle 312 added by the first user because the third user's view has not yet been refreshed.

FIG. 10 again shows the wiring harness design workspace 300 as viewed by the third user, but now the view has been refreshed such that the third user is able to view the slot 310 and wire bundle 312 added by the first user. The wire bundle 312 added by the first user is locked, as represented by the dashed line, which means that the third user is prevented from modifying the wire bundle 312. The slot 310 added by the first user, however, appears to be modifiable by the third user as it is not represented differently in the example (e.g., as represented by a dashed line) than the wiring harness design 304 over which the third user has complete control.

Figure 11:
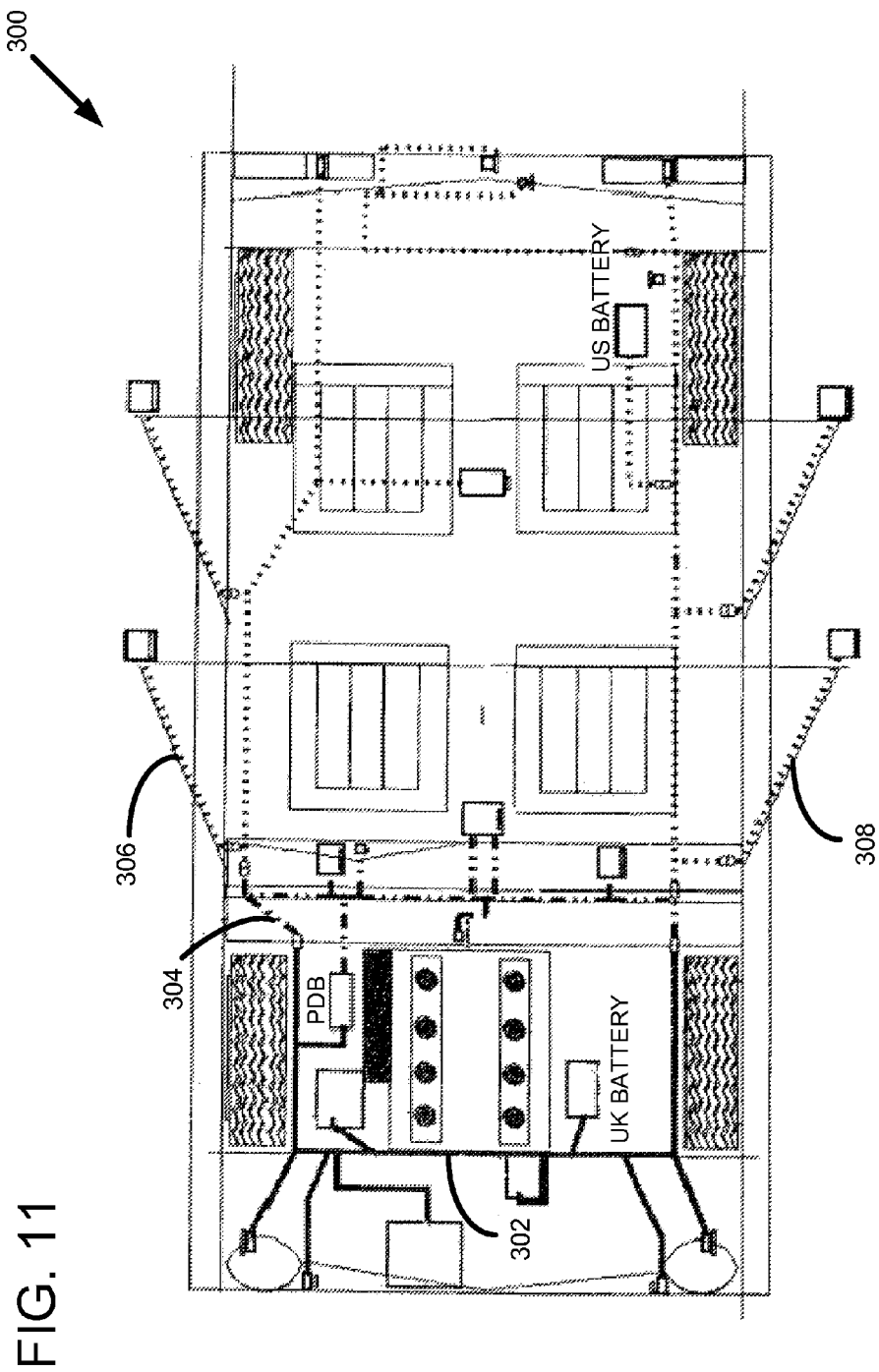
FIG. 11 shows the wiring harness design workspace of FIG. 3 as viewed by the first user.

FIG. 11 shows the wiring harness design workspace 300 as viewed by the first user. FIG. 11 does not show the slot 314 or wire bundle 316 added by the third user because the first user's view has not yet been refreshed.

As can be seen from the foregoing and following examples, embodiments of the systems and methods described herein can allow one or more users to more easily, efficiently, and securely view, create, modify, and/or save one or more wiring harness designs within a given wiring harness design workspace. For example, a tracking functionality can provide an ability to track information pertaining to what locks were implemented and/or removed as well as what users made what changes within a given wiring harness design workspace over a period of time.

Exemplary User Case Scenario

In an exemplary user case scenario, a first user (User1) working within a wiring harness design workspace can create a first slot (Slot1) and a first wiring harness design (Harness1) having two virtual connectors (VConnector1.1 and VConnector1.2) terminating at Slot1. User1 can implement a slot lock on Slot1 and a harness lock on Harness1 while working on them, thereby preventing other users from editing Slot1 and Harness1 for as long as the locks are implemented. Slot1 and Harness1 can be visible to other users, however, such that the other users can monitor what changes are being made by User1. When User1 finishes his or her work, he or she can release the locks, thereby allowing other users to modify Slot1 and/or Harness1.

A second user (User2) can log into the wiring harness design workspace and implement a slot lock on Slot1. User2 can create a second wiring harness design (Harness2) having a virtual connector (VConnector2.1) that terminates at Slot1.

User1 can be informed of the locks by User2 through the user interface. Once User2 finishes his or her work, he or she can release the locks on Harness2 and Slot1.

A third user (User3) can log into the wiring harness design workspace and implement a slot lock on Slot1. The third user can create a third wiring harness design (Harness3) having a virtual connector (VConnector3.1) that terminates at Slot1. The third user can also create another slot (Slot3) and connect Harness3 to Slot3, creating VConnector3.3. Once User3 finishes his or her work within the wiring design workspace, he or she can release the locks.

User2 can place locks on Slot1 and Harness2. The second user can place a first device (Device2) in Slot1, and its pins can be mapped to new cavities within VConnector2.1. User2 can release the locks when finished.

User1 can place locks on Slot1 and Harness1 and place a device (Device1) in Slot1. The pins of Device1 can be mapped to new cavities in VConnector1.1. User1 can release the locks when finished.

User3 can place a slot lock on Slot1 but no harness locks on a harness. User3 can place Device3 in Slot1. A new virtual connector (VConnectorX.1) can be created and the pins of Device3 can be mapped to new cavities on VConnectorX.1. User3 can release the locks when finished.

User2 can place locks on Slot1 and Harness2. User2 can invoke a signal mapping functionality and reorder cavities in VConnector2.1. User2 can copy a pin on Device1 (e.g., to create an additional mapping for that signal) and map it to a cavity on VConnector2.1. Once finished, User2 can release the locks.

User3 can place a slot lock on Slot1 but no harness locks on a harness. User3 can invoke the signal mapping functionality but not signal mapping itself because no virtual connectors are available since no harnesses have been locked. User3 can release the lock on Slot1.

User1 can place locks on Slot1 and Harness1. User1 can invoke the signal mapping functionality and swap the mappings of the Device1 pins between the cavities of VConnector1.1 and VConnector1.2. Once finished, User1 can release the locks.

User2 can place locks on Slot1, Harness1, and Harness2. User2 can invoke the signal mapping functionality and swap the mappings of the Device1 and Device2 pins between cavities of VConnector1.1, VConnector1.2, and VConnector2.1. Once finished, User2 can release the locks.

Exemplary Computer Networks

The disclosed embodiments can be implemented in a wide variety of environments, such as in a computer program product. For example, any of the disclosed techniques can be implemented in software comprising computer-executable instructions stored on computer-readable media (e.g., one or more CDs, volatile memory components (e.g., DRAM or SRAM), or nonvolatile memory components (e.g., hard drives)). This particular software implementation should not be construed as limiting in any way, however, as the principles disclosed herein are generally applicable to other software tools.

Such software can be executed on a single computer or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For the same reason, computer hardware is not described in further detail. For example, the disclosed embodiments can be implemented using a wide variety of commercially available computer systems and/or testing systems. Any of the disclosed methods can alternatively be implemented partially or completely in hardware (e.g., an ASIC or a PLD).

Further, wiring harness designs produced from any of the disclosed methods can be created, updated, or stored on computer-readable media (e.g., one or more CDs, volatile memory components (such as DRAM or SRAM), or nonvolatile memory components (such as hard drives)) using a variety of different data structures or formats.

Figure 12:
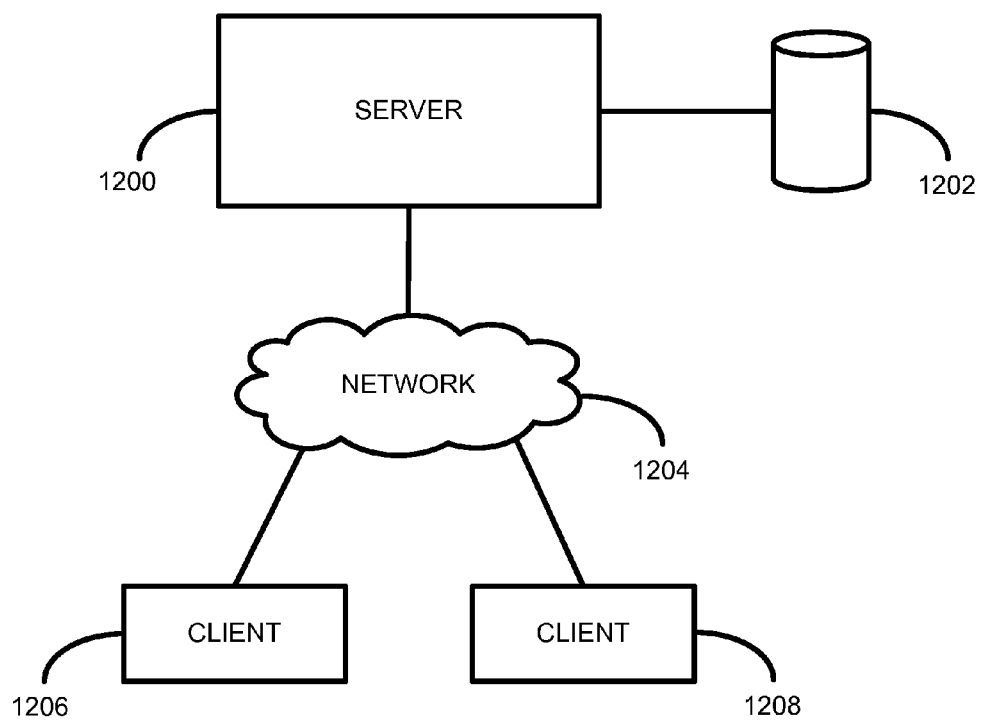
FIG. 12 is a block diagram of an exemplary computer network that can be used with the disclosed technology.

Any of the aspects of the technologies described above can be performed using a distributed computer network. FIG. 12 shows one such exemplary network. A server computer 1200 can have an associated storage device 1202 (internal or external to the server computer). For example, the server computer 1200 can be configured to display wiring harness design information according to any of the disclosed embodiments. The server computer 1200 can be coupled to a network, shown generally at 1204, which can comprise, for example, a wide-area network, a local-area network, a client-server network, the Internet, or other such network. One or more client computers, such as those shown at 1206 and 1208, can be coupled to the network 1204 using a network protocol.

Having shown and described the principles of the illustrated embodiments, it will be apparent to those skilled in the art that the embodiments can be modified in arrangement and detail without departing from such principles. In view of the many possible embodiments, it will be recognized that the illustrated embodiments include only examples and should not be taken as a limitation on the scope of the invention. Rather, the invention is defined by the following claims. We therefore claim as the invention all such embodiments that come within the scope of these claims.

We claim:

1. A method, comprising:
allowing a first user to access and edit a first wiring harness design component in a wiring harness design workspace on a computer;
allowing a second user to access and edit a second wiring harness design component in the wiring harness design workspace at least during a portion of the time that the first user is allowed to access and edit the first wiring harness design component;
displaying the first and second wiring harness design components to the first and second users during at least a portion of the time that access is allowed to the first and second users;
automatically locking, on a component basis, the first wiring harness design component against editing by the second user, upon initiating the edit by the first user; and
automatically refreshing a view of the wiring harness design workspace displayed to the second user, if the edit by the first user impacts at least a portion of the second wiring harness design component accessed by the second user.

2. The method of claim 1, further comprising locking the second wiring harness design component against editing by the first user when the second user has access to the second wiring harness design component for editing by the second user.

3. The method of claim 2, further comprising displaying the wiring harness design components in the wiring harness design workspace and visually indicating and differentiating wiring harness design components that are locked by the first user, that are locked by the second user, and that are unlocked.

4. The method of claim 2, further comprising displaying the wiring harness design components of the wiring harness design workspace and visually indicating and differentiating at least the wiring harness design components locked by the first user from other wiring harness design components in the wiring harness design workspace.

5. The method of claim 4, wherein the act of visually indicating and differentiating comprises dimming at least one of the wiring harness design components in the wiring harness design workspace.

6. The method of claim 5, wherein the act of visually indicating and differentiating also comprises using a different color for at least one of the wiring harness design components.

7. The method of claim 1, further comprising displaying a lock information user interface.

8. The method of claim 7, further comprising the lock information user interface providing user information corresponding to one or more locks within the wiring harness design workspace.

9. The method of claim 1, wherein the first wiring harness design component comprises a wiring harness.

10. The method of claim 9, wherein locking the first wiring harness design component comprises placing a wiring harness lock on the wiring harness.

11. The method of claim 1, wherein the first wiring harness design component comprises a slot.

12. A computer-readable storage medium, which is non-volatile, comprising computer-executable instructions stored therein for performing a method, the method comprising:
   allowing a first user to access and edit a first wiring harness design component in a computer implementing a wiring harness design workspace;
   allowing a second user to access and edit a second wiring harness design component in the wiring harness design workspace while the first user is accessing and editing the first wiring harness design component;
   automatically locking, on a component basis, the first wiring harness design component against editing by the second user, upon initiating the edit by the first user; and
   automatically refreshing a view of the wiring harness design workspace displayed to the second user, if the edit by the first user impacts at least a portion of the second wiring harness design component accessed by the second user.

13. The computer-readable storage medium of claim 12, further comprising locking the second wiring harness design component against editing by the first user when the second user has access to the second wiring harness design component for editing by the second user.

14. The computer-readable storage medium of claim 12, further comprising displaying the wiring harness design components in the wiring harness design workspace and visually indicating and differentiating wiring harness design components that are locked by the first user, that are locked by the second user, and that are unlocked.

15. The computer-readable storage medium of claim 12, further comprising displaying the wiring harness design components of the wiring harness design workspace and visually indicating and differentiating at least the wiring harness design components locked by the first user from other wiring harness design components in the wiring harness design workspace.

16. The computer-readable storage medium of claim 15, wherein the act of visually indicating and differentiating comprises dimming at least one of the wiring harness design components in the wiring harness design workspace.

17. The computer-readable storage medium of claim 12, wherein the act of visually indicating and differentiating also comprises using a different color for at least one of the wiring harness design components.

18. The computer-readable storage medium of claim 12, wherein the first wiring harness design component comprises a wiring harness.

19. The computer-readable storage medium of claim 18, wherein locking on the component basis includes locking the wire harness along an entire length thereof.

* * * * *